United States Patent
Wang et al.

(10) Patent No.: US 9,890,274 B2
(45) Date of Patent: Feb. 13, 2018

(54) HETEROPHASIC POLYPROPYLENE WITH IMPROVED IMPACT STRENGTH/STIFFNESS BALANCE, IMPROVED POWDER FLOWABILITY, REDUCED EMISSIONS AND LOW SHRINKAGE

(71) Applicant: Borealis AG, Vienna (AT)

(72) Inventors: Jingbo Wang, Linz (AT); Pauli Leskinen, Helsinki (FI); Thomas Horrill, Gerasdorf (AT); Markus Gahleitner, Neuhofen/Krems (AT); Cornelia Tranninger, Pucking (AT); Karlheinz Friedrich, Weiden am See (AT); Pavel Shutov, Linz (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 15/519,790

(22) PCT Filed: Oct. 16, 2015

(86) PCT No.: PCT/EP2015/073997
§ 371 (c)(1),
(2) Date: Apr. 17, 2017

(87) PCT Pub. No.: WO2016/066453
PCT Pub. Date: May 6, 2016

(65) Prior Publication Data
US 2017/0240734 A1   Aug. 24, 2017

(30) Foreign Application Priority Data

Oct. 27, 2014   (EP) .................................... 14190440
Jul. 8, 2015   (EP) .................................... 15175779

(51) Int. Cl.
*C08F 210/00*   (2006.01)
*C08F 110/06*   (2006.01)
(Continued)

(52) U.S. Cl.
CPC ........... *C08L 23/12* (2013.01); *C08L 2205/02* (2013.01); *C08L 2205/03* (2013.01);
(Continued)

(58) Field of Classification Search
CPC ...... C08L 23/12; C08L 23/16; C08L 2205/02; C08L 2205/03; C08L 2205/04;
(Continued)

(56) References Cited

U.S. PATENT DOCUMENTS

2010/0240845 A1* 9/2010 Collina .................. C08F 10/00
526/107

FOREIGN PATENT DOCUMENTS

EP   491566 A2   6/1992
EP   586390 B1   5/1997
(Continued)

OTHER PUBLICATIONS

V. Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.
(Continued)

*Primary Examiner* — William Cheung
(74) *Attorney, Agent, or Firm* — Tarolli, Sundheim, Covell & Tummino LLP

(57) ABSTRACT

Heterophasic polypropylene composition with improved impact strength/stiffness balance and with high flowability, reduced emissions and low shrinkage, and its use.

16 Claims, 2 Drawing Sheets

Stiffness/impact balance for inventive and comparable examples in lower MFR range

(51) Int. Cl.
  *C08L 23/00* (2006.01)
  *C08L 25/00* (2006.01)
  *C08L 23/12* (2006.01)

(52) U.S. Cl.
  CPC ....... *C08L 2205/24* (2013.01); *C08L 2207/02* (2013.01); *C08L 2308/00* (2013.01); *C08L 2314/02* (2013.01)

(58) Field of Classification Search
  CPC .............. C08L 2207/01; C08L 2308/00; C08F 210/06; C08F 2/001; C08F 110/14; C08F 4/6491
  USPC .......................... 526/348, 351; 524/855, 856
  See application file for complete search history.

(56) References Cited

FOREIGN PATENT DOCUMENTS

| EP | 591224 B1 | 2/1998 |
| EP | 0887379 A1 | 12/1998 |
| EP | 2275485 A1 | 1/2011 |
| EP | 2610271 A1 | 7/2013 |
| EP | 2610272 A1 | 7/2013 |
| EP | 2610273 A1 | 7/2013 |
| EP | 2738214 A1 | 6/2014 |
| JP | H07-206928 A | 8/1995 |
| JP | 2005-529227 A | 9/2005 |
| JP | 2016-520012 A | 7/2016 |
| WO | 92/12182 A1 | 7/1992 |
| WO | 99/24478 A1 | 5/1999 |
| WO | 99/24479 A1 | 5/1999 |
| WO | 99/24501 A1 | 5/1999 |
| WO | 00/68315 A1 | 11/2000 |
| WO | 2004/000899 A1 | 12/2003 |
| WO | 2004/111095 A1 | 12/2004 |
| WO | 2012/007430 A1 | 1/2012 |

OTHER PUBLICATIONS

V. Busico, et al., "Full Assignment of the 13C NMR Spectra of Regioregular Polypropylenes: Methyl and Methylene Region", Macromolecules 1997, pp. 6251-6263.

V. Busico, et al., "Microstructure of polypropylene", Progress in Polymer Science, 2001, pp. 443-533.

H.N. Cheng, "13C NMR Analysis of Ethylene-Propylene Rubbers", Macromolecules 1984, pp. 1950-1955.

M. Kakugo, et al., "13C NMR Determination of Monomer Sequence Distribution in Ethylene-Propylene Copolymers Prepared with δ-TiCl3-Al(C2H5)2Cl", Macromolecules 1982, pp. 1160-1162.

L. Resconi, "Selectivity in Propene Polymerization with Metallocene Catalysts", Chemical Reviews, 2000, pp. 1253-1345.

G. Singh, et al., "Triad sequence determination of ethylene-propylene copolymers—application of quantitative 13C NMR", Polymer Testing, 2009, pp. 475-479.

W.J. Wang, et al., "Structural Analysis of Ethylene/Propylene Copolymers Synthesized with a Constrained Geometry Catalyst", Macromolecules 2000, pp. 1157-1162.

Z. Zhou, et al., "A new decoupling method for accurate quantification of polyethylene copolymer composition and triad sequence distribution with 13C NMR", Journal of Magnetic Resonance, 2007, pp. 225-233.

International Preliminary Report on Patentability for Application No. PCT/EP2015/073997 dated May 2, 2017.

Notice of Reason for Rejection for Japanese Patent Application No. 2017-520468, dated Sep. 12, 2017.

\* cited by examiner

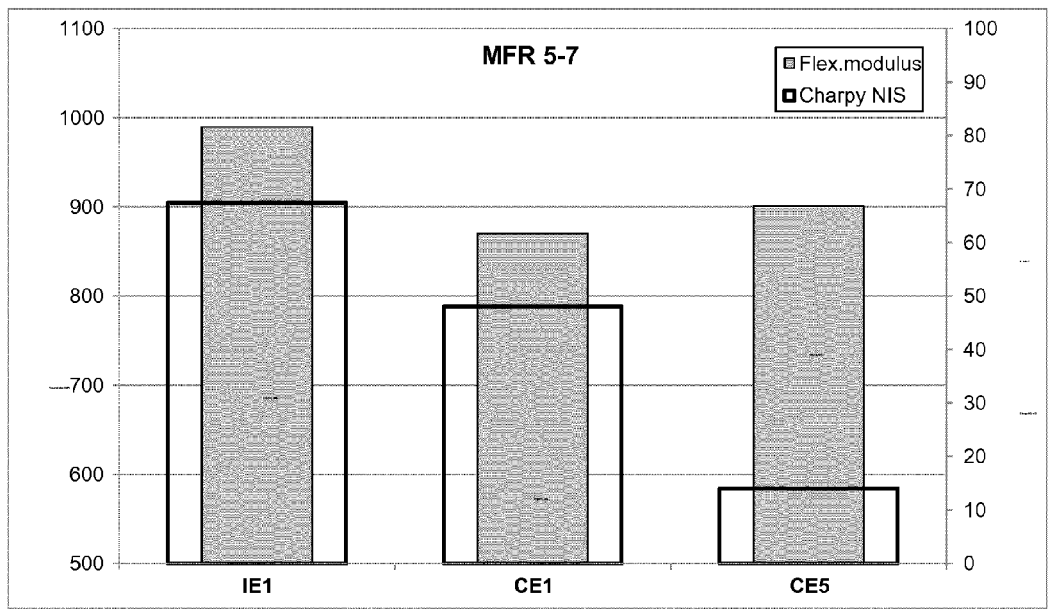
Figure 1 – Stiffness/impact balance for inventive and comparable examples in lower MFR range
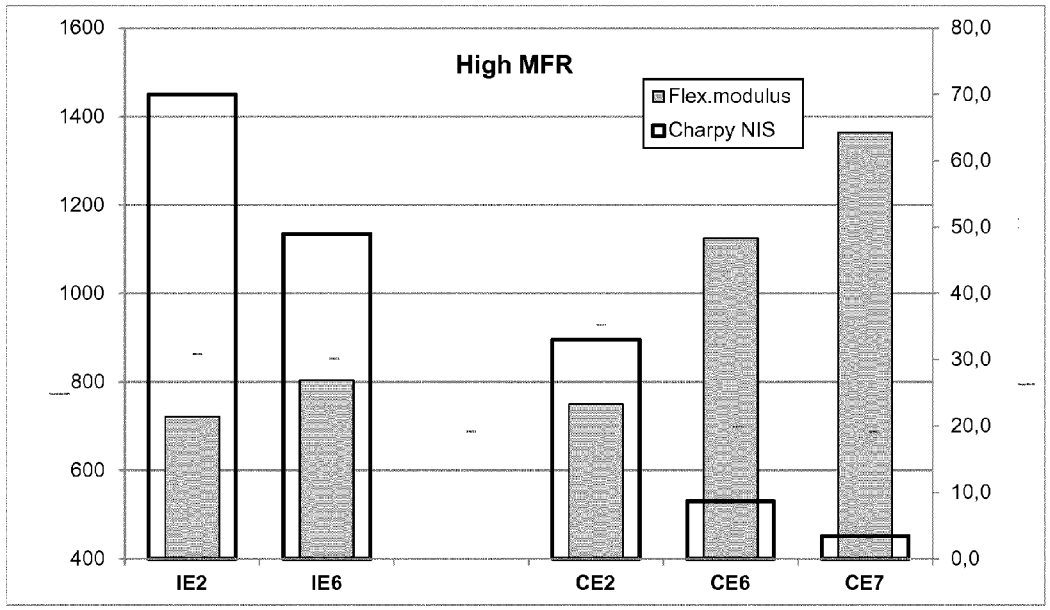
Figure 2 – Stiffness/impact balance for inventive and comparable examples in higher MFR range

Figure 3: Total emissions in comparison
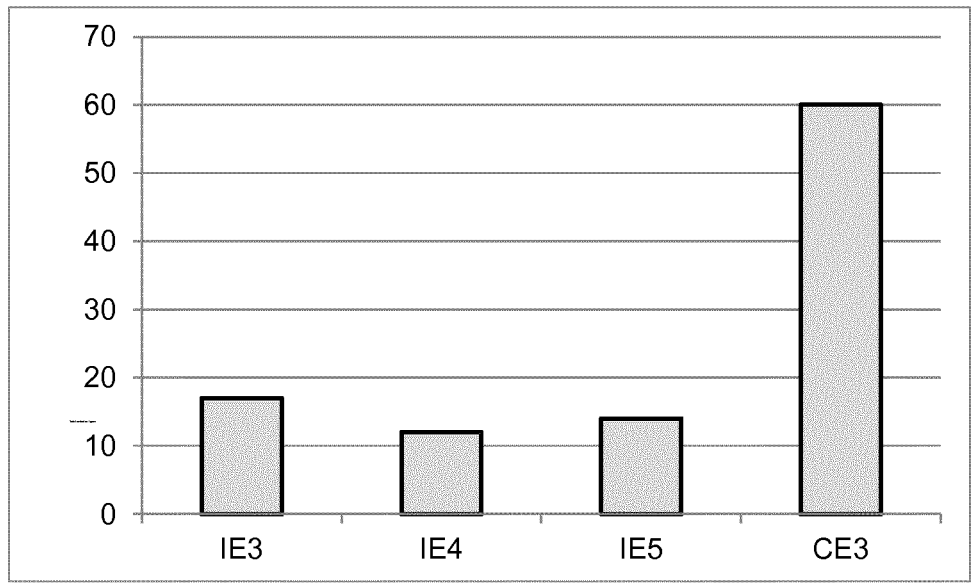
Figure 4: Shrinkage in longitudinal direction
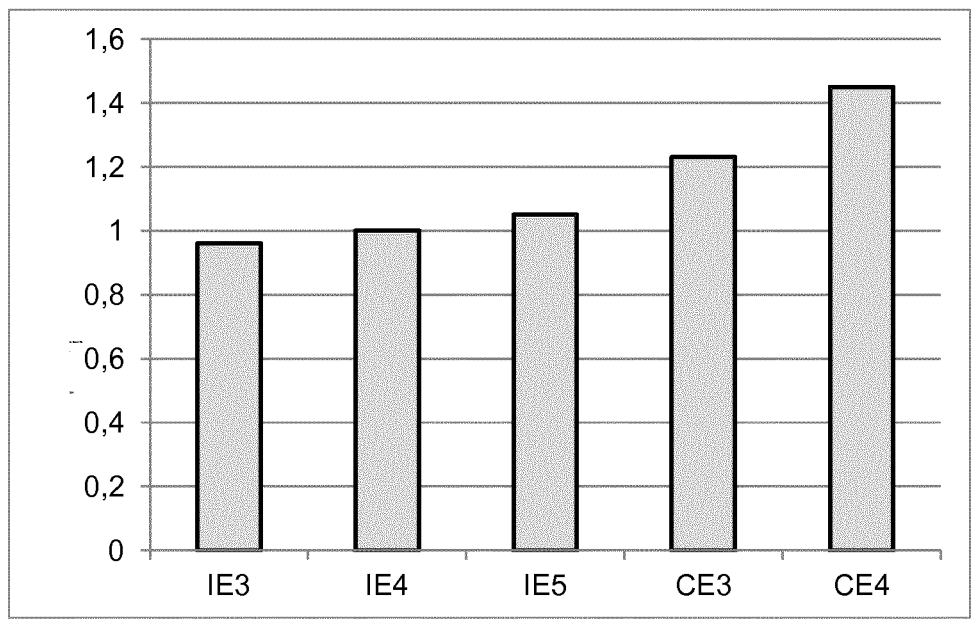

HETEROPHASIC POLYPROPYLENE WITH IMPROVED IMPACT STRENGTH/STIFFNESS BALANCE, IMPROVED POWDER FLOWABILITY, REDUCED EMISSIONS AND LOW SHRINKAGE

This application is a U.S. National Stage application of International Application No. PCT/EP2015/073997, filed Oct. 16, 2015, which claims priority to European Patent Application No. 15175779.6 filed Jul. 8, 2015 and European Patent Application No. 14190440.9 filed Oct. 27, 2014, the contents of each of which is hereby incorporated herein by reference.

The present invention relates to a heterophasic polypropylene composition with an advantageous respectively improved impact strength/stiffness balance and with high powder flowability. Furthermore the heterophasic polypropylene composition has reduced emissions and low shrinkage, whereby simultaneously, due to the high polymer powder flowability, an improved stability of the polymerization process for producing the heterophasic propylene composition is achieved.

Further, the present invention is also directed to an article made of the inventive polypropylene composition, particularly a film, an extruded, blow moulded or injection moulded article. Finally, the present invention is also directed to the use of the inventive polypropylene composition as well as combinations of said composition with fillers or reinforcements for the production of films, extruded, blow moulded or injection moulded articles, such as pouches and bags, pipes and fittings, transport packaging containers as well as components for car exteriors and interiors, like dashboards, door claddings, consoles, bumpers and trims.

BACKGROUND

Polymers, like polypropylene, are increasingly used in different demanding applications. At the same time there is a continuous search for tailored polymers which meet the requirements of these applications. The demands can be challenging, since many polymer properties are directly or indirectly interrelated, i.e. improving a specific property can only be accomplished on the expense of another property. Stiffness can for instance be improved by increasing the crystallinity and/or the relative amount of homopolymer within the composition. As a consequence, the material becomes more brittle, thereby resulting in poor impact properties. It is known that impact strength of polypropylene can be improved by dispersing a rubber phase within the polymer matrix, thereby obtaining a heterophasic polypropylene composition.

Such heterophasic propylene copolymers comprise a matrix being either a propylene homopolymer or a random propylene copolymer in which an amorphous phase, which contains a propylene copolymer rubber (elastomer), is dispersed. Thus the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high resolution microscopy, like electron microscopy or scanning force microscopy or atomic force microscopy, or by dynamic mechanical thermal analysis (DMTA). Further the heterophasic polypropylene may contain to some extent a crystalline polyethylene, which is a by-reaction product obtained by the preparation of the heterophasic propylene copolymer. Such crystalline polyethylene is present as inclusion of the amorphous phase due to thermodynamic reasons.

One preferred application of such heterophasic polypropylene compositions is its use in the field of automotive applications, due to the trend to replace metal parts with plastics, i.e it is particularly desired to replace automotive parts which may be subjected to extremely low temperatures such as −30 or −40° C. still being made from metal alloys by lighter plastics. Furthermore high flow heterophasic materials are specifically desired in the automotive field.

Powder flowability, i.e. non-stickiness of the as-polymerized powder, is especially important for reactor made heterophasic high impact polypropylene compositions (RT-POs), where a polypropylene homopolymer (homo PP) matrix and the rubber as dispersed phase are produced in a multistage process with several reactors in series.

During the reaction the rubber stays in pores and cavities of the particles, which are formed in the first stage of the multistage polymerization. When the pores and cavities in the homo PP matrix are completely filled, the extra rubber starts to migrate to the surface, causing stickiness both between particles, leading to agglomeration of particles, and between particles and the reactor wall. This causes severe problems in the process.

Further nowadays the polymer processors desire material with low emissions to fulfil the consistently rising demands of regulatory authorities as well as consumers.

One further disadvantage of polypropylene resins is that in most moulding processes they are subject to significant post-moulding shrinkage. This means that in applications where dimensional tolerances are important the mould must be tailored to the specific composition and the specific moulding operation to yield a finished part of the precise dimension which is required. This shrinkage problem is particularly troublesome where the manufacturer has moulds tailored to a certain composition and moulding operation and subsequently wishes to substitute a different composition or halter the process to e.g. increase the cooling rate. This problem is enhanced because polypropylene resins show a post-moulding shrinkage difference in the longitudinal and the transversal direction.

Although a lot of development work has been done in the field of heterophasic polypropylene compositions, it was up to now not possible to find a well-balanced polymer composition with respect to impact strength and stiffness in combination with high powder flowability, low emissions and low shrinkage.

Therefore, there is still a need for a heterophasic polypropylene composition which while keeping acceptable (low temperature) impact resistance has high stiffness and high powder flowability in combination with low emissions and low shrinkage.

Hence, it is an object of the present invention to provide such a material.

SUMMARY OF THE INVENTION

The present invention is based on the finding that the above-mentioned objects can be achieved by a particular heterophasic polypropylene composition comprising:
(A) 48 to 78 wt % of a crystalline isotactic propylene homopolymer matrix having a pentad concentration as determined by $^{13}$C-NMR spectroscopy of more than 96 mol % and a matrix melt flow rate ($MFR_M$) as determined at 230° C. and 2.16 kg load according ISO 1133 in the range of 15 to 200 g/10 min, (B) 22 to 52 wt % of a predominantly amorphous propylene copolymer with 25 to 48 wt % of ethylene and/or an α-olefin with 4-10 carbon atoms being present in the composition as dispersed particles, and
(C) 0.0 to 5.0 wt % of a crystalline ethylene copolymer with an α-olefin with 3-10 carbon atoms being present in the composition as inclusions of the dispersed particles of (B) and
(D) 0 to 1.0 wt % of an alpha nucleating agent for the α- and/or γ-phase of isotactic polypropylene,
said composition being further characterized by
(i) a total melt flow rate ($MFR_T$) as determined at 230° C. and 2.16 kg load according ISO 1133 in the range of 2.0 to 50 g/10 min,
(ii) a fraction soluble in xylene (XCS) determined at 25° C. according ISO 16152 in the range of 22 to 52 wt %,
(iii) an intrinsic viscosity of the XCS fraction as measured according to DIN ISO 1628/1 in decalin at 135° C. is in the range of 2.5 to 9.0 dl/g and
(iv) a relative content of isolated to block ethylene sequences (I(E)) of the XCS fraction fulfilling the inequation (I)

$$I(E) < 78 - 1.97 \times C + 0.015 \times (C)^2$$

wherein C is the comonomer content [wt %] of the XCS fraction and
wherein the I(E) content is defined by equation (II)

$$I(E) = \frac{fPEP}{(fEEE + fPEE + fPEP)} \times 100 \quad \text{(II)}$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations being based on a statistical triad analysis of $^{13}$C-NMR data.

The sum of the percentage amounts of the individual components of the composition is equal to 100 percent.

The special combination of especially Components (A) and (B) and their property combinations give rise to a composition having improved properties, such as improved impact strength/stiffness balance, high powder flowability, reduced emissions and low shrinkage. Furthermore especially the high powder flowability leads to an improved stability of the polymerization process for producing the heterophasic propylene composition.

In a first embodiment of the present invention, the heterophasic polypropylene composition is free of phthalic acid esters as well as their respective decomposition products, preferably the heterophasic polypropylene composition is free of phthalic compounds as well as their respective decomposition products.

According to the present invention the term "phthalic compounds" refers to phthalic acid (CAS No. 88-99-3), its mono- and diesters with aliphatic, alicyclic and aromatic alcohols as well as phthalic anhydride.

In a further aspect the invention is related to the use of the composition for the production of films, extruded, blow moulded or injection moulded articles, such as such as pouches and bags, pipes and fittings, transport packaging containers as well as components for car exteriors and interiors, like dashboards, door claddings, consoles, bumpers and trims. In this aspect the composition of the invention can be also used in combinations with fillers or reinforcements.

In yet a further aspect the invention is directed to an article made of the inventive polypropylene composition or of combinations of said composition with fillers or reinforcements, particularly a film or an extruded, blow moulded or injection moulded article.

DETAILED DESCRIPTION

In the following the individual components are defined in more detail.

The particular heterophasic polypropylene composition of the present invention comprises at least component (A) and component (B).

Ad Component (A):

Component (A) of the particular heterophasic polypropylene composition is a crystalline isotactic propylene homopolymer forming the matrix of the heterophasic polypropylene composition.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable.

The propylene homopolymer matrix is isotactic having a high pentad concentration, i.e. higher than 96 mol %, like a pentad concentration of at least 96.3 mol %. The pentad concentration is preferably 96.5 mol % up to 99.9% and more preferably 96.7 mol % to 99.8%.

The propylene homopolymer matrix has a melt flow rate $MFR_2$ (ISO 1133; 230° C.; 2.16 kg) in the range of 15 to 200 g/10 min, preferably in the range of 17 to 170 g/10 min and more preferably in the range of 18 to 150 g/10 min.

The $MFR_2$ of the matrix is named matrix melt flow rate ($MFR_M$).

Moreover it is preferred that the amount of xylene solubles of propylene homopolymer matrix is not too high. Xylene solubles are the part of the polymer soluble in cold xylene determined by dissolution in boiling xylene and letting the insoluble part crystallize from the cooling solution (determined at 25° C. according to ISO 16152). The xylene solubles fraction contains polymer chains of low stereo-regularity and is an indication for the amount of non-crystalline areas. Accordingly it is preferred that the xylene solubles fraction of the propylene homopolymer matrix is in the range of 0.5 wt % to 5.0 wt %, more preferably in the range of 0.7 wt % to 4.5 wt %. In an even more preferred embodiment the xylene solubles fraction is in the range of 0.8 wt % to 4.0 wt %.

The propylene homopolymer has a melting temperature $T_{m1}$ and a melting enthalpy $H_{m1}$ as determined by DSC analysis according to ISO 11357.

Preferably, $T_{m1}$ of the propylene homopolymer is within the range of 160° C. to 170° C., more preferably within the range of 161° C. to 169° C. and most preferably within the range of 162° C. to 168° C.

Preferably, $H_{m1}$ of the propylene homopolymer is in the range of 70 to 100 J/g, more preferably in the range of 70 to 95 J/g and most preferably within the range of 70 to 92 J/g.

The propylene homopolymer matrix can be unimodal or multimodal, like bimodal.

Preferably the propylene homopolymer matrix is multimodal, especially bimodal.

Concerning the definition of unimodal and multimodal, like bimodal, it is referred to the definition below.

Where the propylene homopolymer matrix comprises two or more different propylene polymers these may be polymers with different monomer make up and/or with different molecular weight distributions. These components may have identical or differing monomer compositions and tacticities.

When the propylene homopolymer matrix phase is unimodal with respect to the molecular weight distribution, it may be prepared in a single stage process e.g. a slurry or gas phase process in a slurry or gas phase reactor. Preferably, a unimodal matrix phase is polymerized as a slurry polymerization. Alternatively, the unimodal matrix may be produced in a multistage process using at each stage process conditions which result in similar polymer properties.

The propylene homopolymer matrix, if it is of multimodal or bimodal character, can be produced by blending different polymer types, i.e. of different molecular weight and/or comonomer content. However in such a case it is preferred that the polymer components of the polypropylene matrix are produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Ad Component (B):

Component (B) of the particular heterophasic polypropylene composition is a predominantly amorphous propylene copolymer being present in the composition as dispersed particles. (i.e. dispersed phase)

Suitable comonomers for the propylene copolymer are ethylene and/or α-olefins with 4-10 carbon atoms.

Suitable $C_4$-$C_{10}$ α-olefins are 1-butene, 1-pentene, 1-hexene, 1-heptene and 1-octene. Preferably the component (B) is a copolymer of propylene and ethylene.

The amount of ethylene in component (B) is in the range of 25 to 48 wt %, preferably in the range of 26 to 46 wt % and more preferably in the range of 27 to 45 wt %.

Like the propylene homopolymer matrix, the dispersed phase can be unimodal or multimodal, like bimodal.

In one embodiment, dispersed phase is unimodal. More particularly, the dispersed phase is preferably unimodal in view of the intrinsic viscosity and/or the comonomer distribution. Concerning the definition of unimodal and multimodal, like bimodal, it is referred to the definition above.

Ad Component (C)

As component (C) a crystalline ethylene copolymer with an α-olefin with 3-10 carbon atoms is optionally present.

α-olefins with 3-10 carbon atoms are for example propylene, 1-butene, 1-pentene, 1-hexene, 1-heptene and 1-octene.

The crystalline ethylene copolymer is a by-reaction product obtained by the preparation of the heterophasic polypropylene composition. Such crystalline ethylene copolymer is present as inclusion in the amorphous phase due to thermodynamic reasons.

The crystalline ethylene copolymer has a melting temperature $T_{m2}$ and a melting enthalpy $H_{m2}$ as determined by DSC analysis according to ISO 11357.

Preferably, $T_{m2}$ of the crystalline ethylene copolymer is within the range of 105° C. to 130° C., more preferably within the range of 110° C. to 127° C. and most preferably within the range of 112° C. to 124° C.

Preferably, $H_{m2}$ of the crystalline ethylene copolymer is less than 7 J/g, more preferably less than 6 J/g and most preferably less than 5 J/g.

Ad Component (D)

As component (D) an alpha nucleating agent for the α- and/or γ-phase of isotactic polypropylene is optionally present.

It is well known that different types of crystal nucleating agents will affect the crystal structure of the polymer differently, enhancing the presence and relative amounts of specific crystal modifications of isotactic polypropylene, like the monoclinic α-modification, the pseudo-hexagonal β-modification and the orthorhombic γ-modification.

While the polymer structure will affect the degree of expression of a specific nucleation, the type of crystal formed will be determined by the nucleating agent.

The alpha-nucleating agent (D), if present, is usually added in small amounts of 0.0001 to 1.0 wt %, preferably from 0.0005 to 0.8 wt % and more preferably from 0.001 to 0.5 wt %.

The α-nucleating agent (D) may be any compound which acts as nucleating agent for the monoclinic α-modification and/or orthorhombic γ-modification of polypropylene.

Generally speaking, two classes of α-nucleating agents can be distinguished, namely particulate nucleating agents and soluble nucleating agents.

Particulate nucleating agents show a conventional dispersion mechanism for which particle size and polarity difference to the polymer are decisive. Examples of this class are inorganic nucleating agents like talc, but also organic nucleating agents like sodium benzoate, organophosphates and salts of p-tert-butyl benzoic acid, as well as polymeric nucleating agents like polymerized vinyl compounds such as polyvinylcyclohexane or polytetrafluoroethylene. Further details about these nucleating agents can be found e.g. in WO 99/24479 and WO 99/24501.

Soluble nucleating agents are those with a sequence of dissolution upon heating and recrystallisation upon cooling defining the degree of dispersion. In the latter case, solubility and the resulting crystal shape are decisive for the efficiency. Examples of this class are nucleating agents like sorbitol derivatives, e.g. di(alkylbenzylidene)sorbitols as 1,3:2,4-25 dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl)methylene] nonitol, and benzene-trisamides like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide.

However, in case the heterophasic polypropylene composition comprises an α-nucleating agent, the heterophasic polypropylene composition preferably has a crystallization temperature being above the crystallization temperature of the non-nucleated heterophasic polypropylene composition, whereby the crystallization temperature of the nucleated heterophasic polypropylene composition is more than 120° C. determined by DSC analysis according ISO 11357.

Ad Heterophasic Composition

The heterophasic polypropylene composition of the present inventions is further characterized by a total melt flow rate ($MFR_T$) (ISO 1133; 230° C.; 2.16 kg) in the range of 2.0 to 50 g/10 min, preferably in the range of 2.5 to 45 g/10 min, more preferably in the range of 3.0 to 40 g/10 min and even more preferably in the range of 3.5 to 35 g/10 min.

The ratio of the total melt flow rate of the heterophasic polypropylene composition to the propylene homopolymer matrix melt flow rate $MFR_T/MFR_M$ is ≤0.5.

Preferably the ratio $MFR_T/MFR_M$ is in the range of 0.05 to 0.45, more preferably in the range of 0.07 to 0.40.

The xylene cold soluble (XCS) fraction measured according to according ISO 16152 (25° C.) of the heterophasic polypropylene composition is in the range from 22.0 to 52.0 wt %, preferably in the range from 23.0 to 50.0 wt % and more preferably in the range from 24.0 to 45.0 wt %.

Further it is appreciated that the xylene cold soluble (XCS) fraction of the heterophasic polypropylene composition is specified by its intrinsic viscosity.

For the present invention it is appreciated that the xylene cold soluble fraction (XCS) of the heterophasic polypropylene composition has an intrinsic viscosity (iV) measured according to ISO 1628/1 (at 135° C. in decalin) in the range of 2.5 to 9.0 dl/g, preferably in the range of 2.6 to 8.5 dl/g and more preferably in the range of 2.7 to below 7.0 dl/g.

A further requirement for the xylene cold soluble (XCS) fraction of the heterophasic polypropylene composition is a specific content of isolated to block ethylene sequences (I(E)).

The I(E) content is defined by equation (II)

$$I(E) = \frac{fPEP}{(fEEE + fPEE + fPEP)} \times 100 \qquad (II)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations being based on a statistical triad analysis of $^{13}$C-NMR data.

The I(E) content, which can also be called normalized PEP value (nPEP), has to fulfill the inequation (I):

$I(E) < 78 - 1.97 \times C + 0.015 \times (C)^2$ wherein C is the comonomer content, preferably the ethylene content, [wt %] of the XCS fraction.

Additionally it is preferred that the comonomer content, preferably ethylene content, of the xylene cold soluble (XCS) fraction of the heterophasic polypropylene composition is in the range of 26.0 to 50.0 wt %, preferably in the range of 30.0 to 48.0 wt %, and more preferably in the range of 35.0 to 47.0 wt %.

The comonomers present in the xylene cold soluble (XCS) fraction are those defined above for the propylene copolymer (component B). In one preferred embodiment the comonomer is ethylene only.

It is also appreciated that the total content of the comonomers, i.e. the sum of content of ethylene and α-olefins with 4 to 10 C-atoms, in the total heterophasic polypropylene composition is rather moderate.

Accordingly it is preferred that the heterophasic polypropylene composition has a total comonomer content, preferably ethylene content, in the range of 6.0 to 26.0 wt %, preferably in the range of 6.5 to 25.0 wt % and more preferably in the range of 7.0 to 24.0 wt %.

Furthermore the inventive heterophasic polypropylene composition has at least a first glass transition temperature $T_g(1)$ and a second glass transition temperature $T_g(2)$, wherein said first glass transition temperature $T_g(1)$ is above the second glass transition temperature $T_g(2)$. The glass transition temperature $T_g$ is determined by dynamic mechanical thermal analysis (DMTA) according to ISO 6721-7.

Accordingly the heterophasic polypropylene composition has a first glass transition temperature $T_g(1)$ in the range of −4 to +4° C. and/or a second glass transition temperature $T_g(2)$ in the range of −65 to −35° C.

The multiphase structure of the heterophasic polypropylene composition (predominantly amorphous propylene copolymer dispersed in the matrix) can be identified by the presence of at least two distinct glass transition temperatures. The higher first glass transition temperature ($T_g(1)$) represents the matrix, i.e. the crystalline polypropylene homopolymer, whereas the lower second glass transition temperature ($T_g(2)$) reflects the predominantly amorphous propylene copolymer of the heterophasic polypropylene composition.

Preferably the first glass transition temperature $T_g(1)$ is in the range of −3 to +3° C., more preferably in the range of −2 to +2° C.

The second glass transition temperature $T_g(2)$ is preferably in the range of −58 to −37° C., more preferably in the range of −57 to −38° C.

The heterophasic polypropylene composition of the present invention has an advantageously high powder flowability measured with the powder flowability test according to ISO 6186:1998, Method A, of below 20 seconds, preferably below 18 seconds.

The total emissions of volatiles of the heterophasic polypropylene composition of the present invention measured according to VDA 277:1995 is below 25 ppm and preferably below 20 ppm.

A part made of the heterophasic polypropylene composition of the present invention has a low shrinkage in the longitudinal direction. Preferably, the shrinkage in the longitudinal direction is less than 1.2%, and particularly less than 1.1%.

The shrinkage is measured as stated below in "Description of measurement methods".

The heterophasic polypropylene composition of the present invention has a flexural modulus (FM) measured according to ISO 178 on an injection moulded specimen of 80×10×4 mm$^3$ in the range of 500 to 1100 MPa, preferably in the range of 600 to 1050 MPa and more preferably in the range of 650 to 1020 MPa.

Alternatively the heterophasic polypropylene composition of the present invention has a tensile modulus (TM) measured at 23° C. according to ISO 527-1 (cross head speed 1 mm/min) in the range of 500 to 1100 MPa, preferably in the range of 600 to 1050 MPa and more preferably in the range of 650 to 1020 MPa.

The Charpy notched impact strength of the heterophasic polypropylene composition at 23° C. as measured according to ISO 179-1 eA is at least 10.0 kJ/m², thus is preferably in the range of 12.0 to 100 kJ/m², preferably in the range of 14.0 to 95.0 kJ/m² and more preferably in the range of 15.0 to 90.0 kJ/m².

The Charpy notched impact strength of the heterophasic polypropylene composition at −20° C. as measured according to ISO 179-1 eA is in the range of 4.5 to 35.0 kJ/m², preferably in the range of 5.0 to 32.0 kJ/m² and more preferably in the range of 5.5 to 30.0 kJ/m².

In a preferred embodiment the heterophasic polypropylene composition is preferably free of phthalic acid esters as well as their respective decomposition products, i.e. phthalic acid esters, typically used as internal donor of Ziegler-Natta catalysts used for its production. Preferably, the heterophasic polypropylene composition is free of phthalic compounds as well as their respective decomposition products, i.e. phthalic compounds typically used as internal donor of Ziegler-Natta catalysts.

The term "free of" phthalic acid esters, preferably phthalic compounds, in the meaning of the present invention refers to a heterophasic polypropylene composition in which no phthalic acid esters as well no respective decomposition products, preferably no phthalic compounds as well as no respective decomposition products at all originating from the Ziegler-Natta catalyst are detectable.

The heterophasic polypropylene composition of the present invention is composed of components (A) and (B) and optional components (C) and (D).

Component (A) is present in an amount of from 48 to 78 wt %, preferably from 46 to 76 wt % and more preferably from 45 to 75 wt %

Component (B) is present in an amount of from 22 to 52 wt %, preferably from 25 to 52 wt % and more preferably from 26 to 50 wt %.

Component (C) is present in an amount of from 0 to 5.0 wt %, preferably from 0.1 to 4.0 wt % and more preferably from 0.2 to 3.0 wt %.

Component (D) is present in an amount of from 0 to 1.0 wt %, preferably from 0 to 0.8 wt % and more preferably from 0 to 0.5 wt %.

The sum of fractions (A), (B), (C) and (D) is 100 wt % or lower depending on the presence of further fractions or additives. The ranges in percent by weight (wt %) as used herein define the amount of each of the fractions or components based on the entire heterophasic polypropylene composition according to the present invention. All fractions and components together give a sum of 100 wt.

The heterophasic polypropylene composition according to the present invention apart from the polymeric components and the α-nucleating agent (D) may comprise further non-polymeric components, e.g. additives for different purposes.

The following are optional additives: process and heat stabilisers, pigments and other colouring agents allowing retaining transparency, antioxidants, antistatic agents, slip agents, UV stabilisers, acid scavengers.

Depending on the type of additive, these may be added in an amount of 0.001 to 2.0 wt %, based on the weight of the heterophasic polypropylene composition.

If the heterophasic polypropylene composition according to the present invention is used in combination with fillers or reinforcements, the fillers or reinforcements are present in an amount of less than 30 wt %, preferably less than 25 wt %, more preferably less than 22 wt % based on the total composition.

Suitable fillers to be used in the polypropylene composition of the present invention include, but are not limited to talc, calcium carbonate, chalk, clay, kaolin, silica, fumed silica, mica, wollastonite, feldspar, aluminium silicate, calcium silicate, alumina, hydrated alumina such as alumina trihydrate, glass microspheres, ceramic microspheres, wood flour, marble dust, magnesium oxide, magnesium hydroxide, antimony oxide, zinc oxide, barium sulphate and titanium dioxide.

Examples for reinforcements to be used in the polypropylene composition of the present invention include, but are not limited to mineral fibers, glass fibers, carbon fibers and natural or synthetic organic fibers.

Preparation of the Heterophasic Polypropylene Composition

The heterophasic polypropylene composition can be produced in a multistage process comprising at least three reactors connected in series, wherein the polypropylene homopolymer matrix (A) is produced first and in a subsequent step the propylene copolymer (B) is produced in the presence of the matrix (A) or by blending the matrix polymer (A) with the propylene copolymer (B) after their polymerization.

A further possibility to prepare the heterophasic polypropylene composition of the present invention is blending a heterophasic polypropylene composition produced in a multistage process comprising at least three reactors connected in series, wherein the polypropylene homopolymer matrix (A) is produced first and in a subsequent step the propylene copolymer (B) is produced in the presence of the matrix (A), with specific additional amounts of polypropylene homopolymer matrix (A) in order to achieve the targeted properties of the XCS fraction.

In one preferred embodiment the polypropylene homopolymer matrix (A) is produced in one slurry reactor and a subsequent gas phase reactor and afterwards the propylene copolymer (B) is produced in at least one further gas phase reactor.

Accordingly the heterophasic polypropylene composition of the instant invention can be typically produced in a cascade of at least 3 reactors with an optional $4^{th}$ reactor, where the first reactor is a liquid bulk reactor preferably of loop design and all subsequent reactors are gas phase reactors, preferably of fluidized bed design.

Preferably the components produced in the first two reactors are crystallizable propylene homopolymers (obtaining the matrix), while the component produced in the third reactor is a predominantly amorphous copolymer with higher amounts of comonomer. Optionally a further component can be produced in the fourth reactor, which is either also a predominantly amorphous copolymer or a crystalline ethylene homo- or copolymer.

In case the polypropylene composition, i.e. the heterophasic polypropylene composition, is produced in three or four polymerization reactors (R1), (R2), (R3) and optional (R4), the matrix (A) of the polypropylene composition, i.e. the polypropylene homopolymer, is produced in the polymerization reactor (R1), like in the slurry reactor (SR1), e.g. in the loop reactor (LR1), and the polymerization reactor (R2), like in the gas phase reactor (GPR-1), whereas the predominantly amorphous copolymer (B) is produced in the polymerization reactor (R3), e.g. in the gas phase reactor (GPR-2) and in the optional polymerization reactor (R4), e.g. in the optional gas phase reactor (GPR-3).

It is preferred that
(a) in a first reactor propylene is polymerized obtaining a first propylene homopolymer fraction,
(b) transferring said first propylene homopolymer fraction in a second reactor, (c) polymerizing in said second reactor in the presence of the first propylene homopolymer fraction further propylene obtaining a second propylene homopolymer fraction, said first propylene homopolymer fraction and said second propylene homopolymer fraction form the matrix (A),
(d) transferring said matrix (A) in a third reactor,
(e) polymerizing in said third reactor in the presence of the matrix (A) propylene and ethylene and/or $C_4$ to $C_{10}$ α-olefin obtaining an predominantly amorphous propylene copolymer (B), said matrix (A) and said predominantly amorphous propylene copolymer (B) form the heterophasic polypropylene composition.

In a further preferred mode a third gas phase reactor is used, so that the process further comprises steps
(f) transferring the composition obtained in step (e) to a fourth reactor and
(g) polymerizing in said fourth reactor in the presence of the heterophasic polypropylene composition obtained in the fourth reactor fraction propylene and ethylene and/or $C_4$ to $C_{10}$ α-olefin obtaining a further predominantly amorphous propylene copolymer (B), said further predominantly amorphous propylene copolymer (B) together with the heterophasic polypropylene composition of step (e) form the final heterophasic polypropylene composition.

By using—as stated above—a loop reactor and at least one gas phase reactor in serial configuration and working at different conditions, a multimodal (e.g. bimodal) propylene homopolymer matrix (A) can be obtained.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor, the third and the optional fourth reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor are gas phase reactors. Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis (known as BORSTAR® technology) which is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic polypropylene composition as defined above the conditions for the first reactor, i.e. the slurry reactor, like a loop reactor, may be as follows:
the temperature is within the range of 50° C. to 110° C., preferably between 60° C. and 100° C., more preferably between 62 and 85° C.,
the pressure is within the range of 20 bar to 80 bar, preferably between 40 bar and 70 bar,
hydrogen can be added for controlling the molar mass in a manner known per se.

Subsequently, the reaction mixture of the first reactor is transferred to the second reactor, i.e. gas phase reactor, where the conditions are preferably as follows:
the temperature is within the range of 50° C. to 130° C., preferably between 60° C. and 100° C., more preferably between 75 and 95° C.,
the pressure is within the range of 5 bar to 50 bar, preferably between 15 bar and 35 bar,
hydrogen can be added for controlling the molar mass in a manner known per se.

The conditions in the third reactor and fourth reactor are similar to the second reactor. The residence time can vary in the three reactor zones.

In one embodiment of the process for producing the heterophasic polypropylene composition the residence time in bulk reactor, e.g. loop is in the range 0.1 to 3.5 hours, e.g. 0.15 to 3.0 hours and the residence time in gas phase reactor will generally be 0.2 to 6.0 hours, like 0.5 to 5.0 hours.

If desired, the polymerization may be effected in a known manner under supercritical conditions in the first reactor, i.e. in the slurry reactor, like in the loop reactor, and/or as a condensed mode in the gas phase reactors.

Preferably, the process comprises also a prepolymerization step with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene composition is obtained by a multistage polymerization process, as described above, in the presence of a catalyst system.

As pointed out above in the specific process for the preparation of the heterophasic polypropylene composition as defined above, a specific Ziegler-Natta catalyst must be used.

Accordingly, the Ziegler-Natta catalyst will be now described in more detail. The catalyst used in the present invention is a solid Ziegler-Natta catalyst, which comprises compounds of a transition metal of Group 4 to 6 of IUPAC, like titanium, a Group 2 metal compound, like a magnesium, and an internal donor being preferably a non-phthalic compound, more preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or MgCl2, but the catalyst is self-supported.

The Ziegler-Natta catalyst (ZN-C) can be further defined by the way as obtained.

Accordingly, the Ziegler-Natta catalyst (ZN-C) is preferably obtained by a process comprising the steps of a)
- $a_1$) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or
- $a_2$) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or
- $a_3$) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or
- $a_4$) providing a solution of Group 2 alkoxide of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m+(2-n-m)=2$, provided that both n and $m \neq 0$, $0 < n' \leq 2$ and $0 < m' \leq 2$; and b) adding said solution from step a) to at least one compound of a transition metal of Group 4 to 6 and c) obtaining the solid catalyst component particles,
and adding an internal electron donor, preferably a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion—solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt %, Mg 10 to 20 wt % and donor 10 to 40 wt % of the catalyst composition.

Detailed description of preparation of catalysts is disclosed in WO 2012/007430, EP 2610271, EP 261027 and EP 2610272 which are incorporated here by reference.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula $$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene composition according to this invention is preferably produced in the presence of (a) a Ziegler-Natta catalyst comprising compounds (TC) of a transition metal of Group 4 to 6 of IUPAC, a Group 2 metal compound and an internal donor, wherein said internal donor is a non-phthalic compound, preferably is a non-phthalic acid ester and still more preferably is a diester of non-phthalic dicarboxylic acids;

(b) optionally a co-catalyst (Co), and (c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

If the heterophasic polypropylene composition according to this invention comprises also component (D), an alpha-nucleating agent, the heterophasic polypropylene composition is subsequently alpha nucleated.

The α-nucleating agent and optionally further additives are added to the heterophasic polypropylene composition, which is collected from the final reactor of the series of reactors.

In case the heterophasic polypropylene composition is prepared by compounding of the fractions defined above, any additives may be added together or after said compounding step.

Preferably, these additives are mixed into the composition prior to or during the extrusion process in a one-step compounding process. Alternatively, a master batch may be formulated, wherein the heterophasic polypropylene composition is first mixed with only some of the additives.

For mixing, a conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating. Preferably, the composition will be prepared by blending the additives together with the polymeric material at a temperature, which is sufficiently high to soften and plasticize the polymer. The temperatures and pressures used in the operation of the extruder are known in the art. Typically the temperature may be selected from the range of 150 to 350° C. The pressure used for extrusion preferably is 50 to 500 bar. The polymer materials recovered from the extruder are usually in the form of pellets. These pellets are then preferably further processed, e.g. by injection moulding to generate articles and products of the inventive compositions.

The aforementioned optional blending of a heterophasic polypropylene composition according to the invention with further polypropylene homopolymer matrix material (A) is preferably performed before or in combination with the addition of nucleating agents and other additives or masterbatches.

Thus, in a further embodiment a heterophasic polypropylene composition, prepared as described above, is blended with further polypropylene homopolymer matrix material (A).

In this embodiment a heterophasic polypropylene composition, prepared as described above, is called the "base heterophasic polypropylene composition".

A polypropylene homopolymer matrix material (A) obtained after the first gas phase reactor of a process as described above is taken as blend partner, which leads to a "dilution" of the "base heterophasic polypropylene composition", whereby the properties of the XCS fraction can be optimized in view of amount of XCS and mechanical performance, by carefully adding specific amounts of additional polypropylene homopolymer matrix material (A).

Preferably such blends comprise 75 to 99 wt %, preferably 80 to 95 wt % and more preferably 85 to 93 wt % of "base heterophasic polypropylene composition" and 1.0 to 25 wt %, preferably 5 to 20 wt % and more preferably 7 to 15 wt % of additional polypropylene homopolymer matrix material (A).

For blending again conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating.

Use of Heterophasic Polypropylene Composition

According to a further embodiment of the invention the heterophasic polypropylene composition as well as combinations of said composition with fillers or reinforcements of the invention are used for the production of films, extruded, blow moulded or injection moulded articles, such as pouches and bags, pipes and fittings, transport packaging containers as well as components for car exteriors and interiors, like dashboards, door claddings, consoles, bumpers and trims.

Further, the present invention is also directed to an article made of the inventive polypropylene composition or combinations of said composition with fillers or reinforcements, particularly a film, an extruded, blow moulded or injection moulded article.

The article is produced by any common conversion process suitable for thermoplastic polymers like injection moulding, extrusion blow moulding, injection stretch blow moulding or cast film extrusion.

In case the heterophasic polypropylene composition according to the invention is combined with fillers or reinforcements, the content of said fillers or reinforcements is less than 30 wt %, preferably less than 25 wt %, more preferably less than 22 wt % based on the heterophasic polypropylene composition.

EXPERIMENTAL PART

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}$C{$^1$H} NMR spectra were processed, integrated and relevant quantitative properties determined from the integrals using proprietary computer programs. For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences. The isotacticity was determined at the pentad level and reported as the percentage of isotactic pentad (mmmm) sequences with respect to all pentad sequences:

$$[mmmm]\% = 100*(mmmm/\text{sum of all pentads})$$

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio-defects:

$$P_{total} = P_{12} + P_{21e}$$

The mole percent of 2,1 erythro regio-defects was quantified with respect to all propene:

$$[21e]\text{mol.-}\% = 100*(P_{21e}/P_{total})$$

Comonomer Determination by NMR Spectroscopy

Quantitative nuclear-magnetic resonance (NMR) spectroscopy was further used to quantify the comonomer content and comonomer sequence distribution of the polymers. Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%] = 100*fE$$

The weight percent comonomer incorporation was calculated from the mole fraction:

$$E[\text{wt }\%] = 100*(fE*28.06)/((fE*28.06) + ((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The xylene soluble fraction at room temperature (XCS, wt %): The amount of the polymer soluble in xylene is determined at 25° C. according to ISO 16152; 5$^{th}$ edition; 2005 Jul. 1.

Intrinsic Viscosity (iV)

The intrinsic viscosity (V) value increases with the molecular weight of a polymer. The iV values e.g. of the XCS were measured according to ISO 1628/1 in decalin at 135° C.

DSC analysis, melting temperature ($T_m$), melting enthalpy ($H_m$), crystallization temperature ($T_a$) and crystallization enthalpy ($H_e$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_a$) and crystallization enthalpy ($H_e$) are determined from the cooling step, while melting temperature ($T_m$) and melting enthalpy ($H_m$) are determined from the second heating step respectively from the first heating step in case of the webs.

The glass transition temperature Tg is determined by dynamic mechanical thermal analysis according to ISO 6721-7. The measurements are done in torsion mode on compression moulded samples (40×10×1 mm$_3$) between −100° C. and +150° C. with a heating rate of 2° C./min and a frequency of 1 Hz.

MFR$_2$ (230° C.) is measured according to ISO 1133 (230° C., 2.16 kg load) The melt flow rate is measured as the MFR2 in accordance with ISO 1133 15 (230° C., 2.16 kg load) for polypropylene and in accordance with ISO 1133 (190° C., 2.16 kg load) for polyethylene and is indicated in g/10 min. The MFR is an indication of the flowability, and hence the processability, of the polymer. The higher the melt flow rate, the lower the viscosity of the polymer.

The MFR2 of a fraction (B) produced in the presence of a fraction (A) is calculated using the measured values of MFR2 of fraction (A) and the mixture received after producing fraction (B) ("final"):

$$\text{Log}(\text{MFR}_{final}) = \text{weight fraction}(A) \cdot \text{Log}(\text{MFR}_A) + \text{weight fraction}(B) \cdot \text{Log}(\text{MFR}_B)$$

Total Emissions of Volatiles

The total emission of the polymers was determined by using multiple head space extraction according to VDA 277:1995 using a gas chromatograph and a headspace method. The equipment was a Hewlett Packard gas chromatograph with a WCOT-capillary column (wax type) of 30 m length and 0.25 mm×2.5 μm inner diameter (0.25 μm film thickness). A flame ionisation detector was used with hydrogen as a fuel gas.

The GC settings were as follows: 3 minutes isothermal at 50° C., heat up to 200° C. at 12

K/min, 4 minutes isothermal at 200° C., injection-temperature: 200° C., detection-temperature:

250° C., carrier helium, flow-mode split 1:20 and average carrier-speed 22-27 cm/s.

The emission potential was measured on the basis of the sum of all values provided by the emitted substances after gas chromatography analysis and flame ionization detection with acetone as the calibration standard. Sample introduction (pellets, about 1 gram) was by headspace analysis (10 ml head space vial) after conditioning at 120° C. for 5 hours prior to the measurement.

The unit is μgC/g (μg carbon per g of sample), respectively ppm.

Shrinkage

The shrinkage is determined by injection moulding of the resin with an injection moulding machine into a mould having a cavity to form a plate of 150×80×2 mm$^3$ in line with ISO 1873. After cooling at room temperature for 96 hours, the length and the width of the plate are determined to calculate the longitudinal and the transversal shrinkage in percent.

Charpy Notched Impact Strength

Charpy notched impact is measured according to ISO 179/1 eA at +23° C. and at −20° C. using an injection moulded test specimen (80×10×4 mm) as produced according to ISO 1873.

Flexural Modulus:

The flexural modulus was determined in 3-point-bending according to ISO 178 on 80×10×4 mm$^3$ test bars injection moulded at 23° C. in line with EN ISO 1873-2.

Tensile Modulus:

The tensile modulus was measured at 23° C. according to ISO 527-1 (cross head speed 1 mm/min) using injection moulded specimens moulded at 180° C. or 200° C. according to ISO 527-2(1B), produced according to EN ISO 1873-2 (dog 10 bone shape, 4 mm thickness).

Powder Flowability:

The powder flowability was measured with the powder flowability test according to ISO 6186:1998, Method A.

B. Examples

The catalyst used in the polymerization process for the heterophasic polypropylene composition of the inventive examples (IE 1 to 5) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of the Mg Alkoxy Compound Mg alkoxide solution was prepared by adding, with stirring (70 rpm), into 11 kg of a 20 wt % solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and di(cyclopentyl) dimethoxy silane (D-donor) as donor.

The molar ratio of co-catalyst (Co) to external donor (ED) [Co/ED] and the molar ratio of co-catalyst (Co) to titanium compound (TC) [Co/TC] are indicated in table 1.

Polymerization was performed in a Borstar pilot plant, comprising a prepolymerization reactor, a loop reactor and two or three gas phase reactors. The polymerization conditions are also indicated in table 1.

The properties of the products obtained from the individual reactors naturally are not measured on homogenized material but on reactor samples (spot samples). The properties of the final resin are measured on homogenized material, the MFR2 on pellets made thereof in an extrusion mixing process as described below.

For Inventive Examples Ex.6 the polymer obtained in Ex.2 was taken as "base heterophasic polypropylene composition" which was then blended.

As blend partner a propylene homopolymer matrix polymer (PP-H) produced with the above described catalyst under the above described polymerization conditions for Ex.2 in prepoly, loop reactor (R1) and $1^{st}$ GPR (R2) was used.

TABLE 1

Polymerization of inventive examples

|  |  | Ex. 1 | Ex. 2 | Ex. 3 | Ex. 4 | Ex. 5 |
|---|---|---|---|---|---|---|
| Prepoly |  |  |  |  |  |  |
| Residence time | [h] | 0.2 | 0.2 | 0.3 | 0.3 | 0.3 |
| Temperature | [° C.] | 28 | 28 | 30 | 30 | 30 |
| Co/ED ratio | [mol/mol] | 7.1 | 20 | 6.71 | 6.76 | 6.81 |
| Co/TC ratio | [mol/mol] | 323 | 273 | 315 | 217 | 251 |
| Loop (R1) |  |  |  |  |  |  |
| Residence time | [h] | 0.41 | 0.41 | 0.24 | 0.25 | 0.21 |
| Temperature | [° C.] | 70 | 80 | 70 | 70 | 70 |
| $H_2/C_3$ ratio | [mol/kmol] | 4.61 | 10.4 | 12.4 | 12.3 | 12.5 |
| $MFR_2$ | [g/10 m]in | 20 | 86 | 71 | 72 | 66 |
| XCS | [wt %] | 2.4 | 3 | 2.6 | 2.7 | 2.7 |
| C2 content | [wt %] | 0 | 0 | 0 | 0 | 0 |
| split | [wt %] | 36 | 40 | 33 | 33 | 38 |
| 1st GPR (R2) |  |  |  |  |  |  |
| Residence time | [h] | 0.16 | 0.4 | 0.39 | 0.38 | 0.35 |
| Temperature | [° C.] | 80 | 85 | 80 | 80 | 80 |
| Pressure | [kPa] | 15 | 22 | 15 | 15 | 15 |
| $H_2/C_3$ ratio | [mol/kmol] | 42 | 149 | 13 | 13 | 12 |
| $MFR_2$ ($MFR_M$) | [g/10 min] | 21 | 92 | 75 | 75 | 79 |
| XCS | [wt %] | 2 | 3.3 | 2.8 | 2.8 | 2.8 |
| C2 content | [wt %] | 0 | 0 | 0 | 0 | 0 |
| split | [wt %] | 38 | 35 | 33 | 31 | 30 |
| $2^{nd}$ GPR (R3) |  |  |  |  |  |  |
| Residence time | [h] | 0.08 | 0.09 | 0.13 | 0.14 | 0.14 |
| Temperature | [° C.] | 70 | 75 | 70 | 70 | 70 |
| Pressure | [kPa] | 15 | 19 | 14 | 14 | 14 |
| $C_2/C_3$ ratio | [mol/kmol] | 550 | 440 | 250 | 460 | 450 |
| $H_2/C_2$ ratio | [mol/kmol] | 119 | 90 | 7 | 4.5 | 7 |
| $MFR_2$ | [g/10 min] | 5.3 | 17 | 32 | 22 | 15 |
| C2 content | [wt %] | 15.6 | 15.8 | 7.2 | 12.6 | 15.3 |
| XCS | [wt %] | 26 | 28.9 | 21 | 24 | 23 |
| split | [wt %] | 26 | 15 | 17 | 18 | 16 |
| $3^{rd}$ GPR (R4) |  |  |  |  |  |  |
| Residence time | [h] | — | 0.11 | 1.19 | 1.28 | 1.26 |
| Temperature | [° C.] | — | 80 | 75 | 75 | 75 |
| Pressure | [kPa] | — | 19 | 14 | 14 | 14 |
| $C_2/C_3$ ratio | [mol/kmol] | — | 649 | 250 | 450 | 460 |
| $H_2/C_2$ ratio | [mol/kmol] | — | 193 | 4 | 7 | 4 |
| $MFR_2$ | [g/10 min] | — | 8.6 | 32 | 23 | 15 |
| C2 content | [wt %] | — | 19.5 | 7.2 | 12.6 | 15.3 |
| XCS | [wt %] | — | 35.1 | 31 | 34 | 36 |
| split | [wt %] | — | 10 | 17 | 18 | 16 |
| MFR(last reactor)/$MFR_M$ | — | 0.25 | 0.09 | 0.43 | 0.31 | 0.19 |
| Powder flowability | [s] | n.m | n.m | 17 | 16 | 16 |

TABLE 2 blend partner propylene homopolymer (PP-H)

|  |  | PP-H |
|---|---|---|
| Prepoly |  |  |
| Residence time | [h] | 0.2 |
| Temperature | [° C.] | 28 |
| Co/ED ratio | [mol/mol] | 20 |
| Co/TC ratio | [mol/mol] | 273 |
| Loop (R1) |  |  |
| Residence time | [h] | 0.41 |
| Temperature | [° C.] | 80 |
| $H_2/C_3$ ratio | [mol/kmol] | 10.4 |
| $MFR_2$ | [g/10 m]in | 86 |
| XCS | [wt %] | 3 |
| C2 content | [wt %] | 0 |
| split | [wt %] | 65 |
| 1st GPR (R2) |  |  |
| Residence time | [h] | 0.4 |
| Temperature | [° C.] | 85 |
| Pressure | [kPa] | 22 |
| $H_2/C_3$ ratio | [mol/kmol] | 149 |
| $MFR_2$ ($MFR_M$) | [g/10 min] | 92 |
| XCS | [wt %] | 3.3 |
| C2 content | [wt %] | 0 |
| split | [wt %] | 35 |

Ex. 6: Blend Containing 90 wt % of "Base Heterophasic Polypropylene Composition" (Ex.2) and 10 wt % Propylene Homopolymer (PP-H)

Blending was done in combination with the additive mixing in a Coperion W&P ZSK40 twin screw extruder in a temperature range of 220-240° C.

Used additives for all resins: 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphate (CAS-no. 31570-04-4, trade 10 name Irgafos 168) supplied by BASF AG, and 0.05 wt % Calcium stearate (CAS-no. 1592-23-0) supplied by Croda Polymer Additives For the Comparative Examples CE1 and CE2 the following heterophasic polypropylene polymers were prepared as described below:

Comparative Example CE1

ZN104 commercially available from Basell was used in case of CE1

Comparative Example CE2 and CE3

Catalyst Preparation for CE2 and CE3

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

Catalyst and its preparation concept is described in general e.g. in patent publications EP 491566, EP 591224 and EP 586390.

The catalyst was further modified (VCH modification of the catalyst).

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in above (Ti content 1.4 wt %) was added and after additionally 20 minutes 5.0 g of vinylcyclohexane (VCH) was added.). The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

As external donor di(cyclopentyl) dimethoxy silane (donor D) was used for CE1 as well as for CE2.

Comparative Example CE4

The same catalyst as for CE2 was used (see above Catalyst preparation), with the exception that the catalyst was not further modified (no VCH modification of the catalyst).

Comparative Example CE5

Comparative Example 5 CE5 was prepared by using the catalyst used for Ex.1 and Ex.2 in a four reactor set up as for Ex.2

TABLE 3 + 4

Polymerization of comparative example CE1, CE2, CE3, CE4 and CE5

|  |  | CE1 |
|---|---|---|
| Prepoly |  |  |
| Residence time | [h] | 0.06 |
| Temperature | [° C.] | 20 |
| Co/ED ratio | [mol/mol] | 9.0 |
| Co/TC ratio | [mol/mol] | 120 |
| $1^{st}$ Loop (R1) |  |  |
| Residence time | [h] | 0.50 |
| Temperature | [° C.] | 70 |
| $H_2/C_3$ ratio | [mol/kmol] | 3.10 |
| $MFR_2$ | [g/10 m]in | 23 |
| XCS | [wt %] | 2.0 |
| C2 content | [wt %] | 0 |
| split | [wt %] | 38 |
| $2^{nd}$ Loop (R2) |  |  |
| Residence time | [h] | 0.50 |
| Temperature | [° C.] | 70 |
| $H_2/C_3$ ratio | [mol/kmol] | 3.10 |
| $MFR_2$ ($MFR_M$) | [g/10 min] | 23 |
| XCS | [wt %] | 2.0 |
| C2 content | [wt %] | 0 |
| split | [wt %] | 38 |
| $1^{st}$ GPR (R3) |  |  |
| Residence time | [h] | 0.30 |
| Temperature | [° C.] | 85 |
| Pressure | [kPa] | 2800 |
| $C_2/C_3$ ratio | [mol/kmol] | 920 |

TABLE 3 + 4-continued

Polymerization of comparative example CE1, CE2, CE3, CE4 and CE5

|  |  | CE1 |
|---|---|---|
| $H_2/C_2$ ratio | [mol/kmol] | 140 |
| $MFR_2$ | [g/10 min] | 6 |
| C2 content | [wt %] | 8.5 |
| split | [wt %] | 14 |
| $2^{nd}$ GPR (R4) | | |
| Residence time | [h] | 0.30 |
| Temperature | [° C.] | 85 |
| Pressure | [kPa] | 2750 |
| $C_2/C_3$ ratio | [mol/kmol] | 920 |
| $H_2/C_2$ ratio | [mol/kmol] | 140 |
| $MFR_2$ ($MFR_T$) | [g/10 min] | 6 |
| C2 content | [wt %] | 16.5 |
| split | [wt %] | 10 |
| MFR ratio ($MFR_T/MFR_M$) | — | 0.26 |

TABLE 4

Polymerization of comparative example CE2, CE3, CE 4 and CE5

|  |  | CE2 | CE3 | CE4 | CE5 |
|---|---|---|---|---|---|
| Prepoly | | | | | |
| Residence time | [h] | 0.08 | 0.2 | 0.28 | 0.2 |
| Temperature | [° C.] | 30 | 30 | 30 | 28 |
| Co/ED ratio | [mol/mol] | 8.0 | 7.20 | 7.0 | 8.11 |
| Co/TC ratio | [mol/mol] | 160 | 220 | 230 | 173.12 |
| Loop (R1) | | | | | |
| Residence time | [h] | 0.6 | 0.25 | 0.33 | 0.33 |
| Temperature | [° C.] | 70 | 70 | 70 | 80 |
| $H_2/C_3$ ratio | [mol/kmol] | 20.5 | 14.8 | 1.28 | 3.73 |
| $MFR_2$ | [g/10 min] | 85 | 55 | 2.17 | 24 |
| XCS | [wt %] | 2.2 | 2.0 | 4.5 | 2.5 |
| C2 content | [wt %] | 0 | 0 | 0 | 0 |
| split | [wt %] | 64 | 25 | 30 | 30 |
| $1^{st}$ GPR (R2) | | | | | |
| Residence time | [h] | 0.75 | 0.35 | 0.20 | 3.25 |
| Temperature | [° C.] | 80 | 80 | 80 | 80 |
| Pressure | [kPa] | 2300 | 21 | 22 | 2800 |
| C2/C3 ratio | mol/kmol | 0 | 0 | 13.7 | 0 |
| $H_2/C_3$ ratio | [mol/kmol] | 130.2 | 55 | 32.5 | 41.5 |
| $MFR_2$ [$MFR_M$] | [g/10 min] | 85 | 2.0 | 1.69 | 23 |
| XCS | [wt %] | 2.0 | 0 | 5.0 | 1.8 |
| C2 content | [wt %] | 0 | 40 | 2.3 | 0 |
| split | [wt %] | 13 | 55 | 30 | 49 |
| $2^{nd}$ GPR (R3) | | | | | |
| Residence time | [h] | 0.6 | 0.20 | 0.35 | 0.92 |
| Temperature | [° C.] | 80 | 70 | 70 | 75 |
| Pressure | [kPa] | 2250 | 20 | 20 | 2701 |
| $C_2/C_3$ ratio | [mol/kmol] | 680 | 580 | 302 | 144 |
| $H_2/C_2$ ratio | [mol/kmol] | 265.5 | 11.6 | 214 | 979 |
| $MFR_2$ | [g/10 min] | 28 | 20 | 1.11 | 6.3 |
| C2 content | [wt %] | 12 | 8.5 | 14.3 | 19.2 |
| split | [wt %] | 13 | 20 | 44 | 15 |
| $3^{rd}$ GPR (R4) | | | | | |
| Residence time | [h] | 0.6 | 1.10 | 0.40 | 0.92 |
| Temperature | [° C.] | 80 | 84 | 70 | 75 |
| Pressure | [kPa] | 2200 | 13 | 18 | 2701 |
| $C_2/C_3$ ratio | [mol/kmol] | 1040 | 585 | 282 | 144 |
| $H_2/C_2$ ratio | [mol/kmol] | 350.1 | 9.2 | 192 | 979 |
| $MFR_2$ ($MFR_T$) | [g/10 min] | 18 | 11 | 0.97 | 6.32 |
| C2 content | [wt %] | 20 | 13 | 16.4 | 19.2 |
| split | [wt %] | 10 | 32 | 44 | 9 |
| MFR ratio ($MFR_T/MFR_M$) | — | — | 0.21 | 0.2 | 0.57 | 0.27 |
| Powder flowability | [s] | n.m. | 14 | 18 | n.m. |

Comparative Example CE6 and CE7 are blends.

For preparing the blends the polymer obtained in Ex.2 was taken as "base heterophasic polypropylene composition" which was then blended.

As blend partner a propylene homopolymer matrix polymer (PP-H) produced with the above described catalyst under the above described polymerization conditions for Ex.2 in prepoly, loop reactor (R1) and $1^{st}$ GPR (R2) was used. (conditions are shown in Table 2).

CE6: Blend containing 40 wt % of "base heterophasic polypropylene composition" (Ex.2) and 60 wt % propylene homopolymer (PP-H)

CE7: Blend containing 20 wt % of "base heterophasic polypropylene composition" (Ex.2) and 80 wt % propylene homopolymer (PP-H)

The polymer of Comparative Example 8 is the propylene homopolymer matrix polymer (PP-H) produced with the above described catalyst under the above described polymerization conditions for Ex.2 in prepoly, loop reactor (R1) and $1^{st}$ GPR (R2) was used. (conditions are shown in Table 2).

The properties of the products obtained from the individual reactors naturally are not measured on homogenized material but on reactor samples (spot samples). The properties of the final resin are measured on homogenized material, the MFR2 on pellets made thereof in an extrusion mixing process as described below.

All resins were mixed in a twin-screw extruder with 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphate (CAS-no. 31570-04-4, trade name Irgafos 168) supplied by BASF AG, and 0.05 wt % Calcium stearate (CAS-no. 1592-23-0) supplied by Croda Polymer Additives.

The polymer properties are listed in Table 5 and Table 6:

TABLE 5

Polymer Properties of Inventive Examples Ex. 1 to Ex. 6

| Properties | unit | Ex. 1 | Ex. 2 | Ex. 3 | Ex. 4 | Ex. 5 | Ex. 6 |
|---|---|---|---|---|---|---|---|
| $MFR_2$ | [g/10 min] | 5 | 9 | 16 | 11 | 8 | 12 |
| <mmmm> NMR | [mol %] | 97.4 | 97.6 | 97.6 | 97.6 | 97.2 | 97.6 |
| Tm(PP, DSC) | [° C.] | 164 | 165 | 167 | 166 | 166 | 165 |
| Hm(PP, DSC) | [J/g] | 75 | 70 | n.d. | n.d. | n.d. | 74 |
| Tm(PE, DSC) | [° C.] | 119 | 117 | 114 | 117 | 117 | 117 |
| Hm(PE, DSC) | [J/g] | 0.3 | 0.4 | n.d. | n.d. | n.d. | 0.3 |
| Tc(DSC) | [° C.] | 119 | 120 | 127 | 128 | 128 | 120 |

TABLE 5-continued

Polymer Properties of Inventive Examples Ex. 1 to Ex. 6

| Properties | unit | Ex. 1 | Ex. 2 | Ex. 3 | Ex. 4 | Ex. 5 | Ex. 6 |
|---|---|---|---|---|---|---|---|
| Tg(PP, DMA) | [° C.] | 0.8 | 2 | −0.1 | 2.0 | 1.9 | 2 |
| Tg(EPR, DMA) | [° C.] | −54 | −52 | −40 | −50 | −48 | −52 |
| XCS | [wt %] | 27 | 36 | 31.3 | 34.3 | 35.5 | 31 |
| C2(XCS, NMR) | [wt %] | 45 | 44 | 30.8 | 41.7 | 40.7 | 44 |
| iV(XCS) | [dl/g] | 3.8 | 3.9 | 2.9 | 3.3 | 3.7 | 3.9 |
| FM ISO 178 | [MPa] | 990 | 721 | n.d. | n.d. | n.d. | 803 |
| TM ISO 178 | [MPa] | n.d. | n.d. | 946 | 889 | 847 | n.d. |
| NIS ISO 179 1eA 23° C. | [kJ/m$^2$] | 67.4 | 70.0 | 63 | 68.3 | 67.8 | 49 |
| NIS ISO 179 1eA −20° C. | [kJ/m$^2$] | 11.9 | 15.1 | 8.9 | 13.7 | 15.4 | 9.9 |
| C2 total (NMR) | wt % | 16.4 | 18.7 | 11.4 | 18.7 | 19.2 | 16.4 |
| EEE total | mol % | 12.0 | 12.9 | 6.4 | 12.7 | 12.9 | 12.0 |
| EEP total | mol % | 8.1 | 9.4 | 6.23 | 9.07 | 9.37 | 8.1 |
| PEP total | mol % | 2.9 | 4.2 | 4.18 | 3.75 | 4.24 | 2.9 |
| PEP total normalized | % | 12.5 | 16.0 | 25 | 15 | 16 | 12.5 |
| EEE (XCS) | mol % | 21.5 | 18.9 | 11.6 | 18.9 | 18.6 | 21.5 |
| EEP (XCS) | mol % | 23.6 | 22.0 | 16.6 | 21.9 | 22.2 | 23.6 |
| PEP (XCS) | mol % | 10.0 | 10.0 | 12.3 | 11.0 | 11.1 | 10.0 |
| PEP (XCS) normalized | % | 18.2 | 19.6 | 30.4 | 21.2 | 21.4 | 18.2 |
| total emission | ppm | n.m. | n.m. | 17 | 12 | 14 | n.m. |
| Sh-in flow | % | n.m. | n.m. | 0.96 | 1.0 | 1.05 | n.m. |
| Inequation (I) fulfilled | | yes | yes | yes | yes | yes | yes |

FM flexural modulus
TM tensile modulus
n.m. not measured
n.d. not determind
Sh-in flow Shrinkage in flow direction
PEP (XCS) normalized=I(E)

From Table 5 and Table 6

From Tables 5 and 6 it can be clearly seen that the Inventive heterophasic polypropylene compositions have a comparable high powder flowability, reduced emissions and

TABLE 6

Polymer Properties of Comparative Examples CE1 to CE8

| Properties | unit | CE1 | CE2 | CE3 | CE4 | CE5 | CE6 | CE7 | CE8 |
|---|---|---|---|---|---|---|---|---|---|
| MFR$_2$ | [g/10 min] | 6 | 18 | 50 | 3.6 | 7 | 43 | 68 | 89 |
| <mmmm> NMR | [mol %] | 96.6 | 96.6 | 96.6 | 96.2 | 96.9 | 97.6 | 97.6 | 97.6 |
| Tm(PP, DSC) | [° C.] | 165 | 163 | 165 | 166 | 164 | 165 | 165 | 165 |
| Hm(PP, DSC) | [J/g] | 76 | 71 | n.d. | n.d. | 72 | 93 | 100 | 106 |
| Tm(PE, DSC) | [° C.] | 117 | 119 | 117 | — | 119 | 117 | 117 | — |
| Hm(PE, DSC) | [J/g] | 0.3 | 2.7 | n.d. | n.d. | 1.2 | 0.1 | 0.0 | — |
| Tc(DSC) | [° C.] | 112 | 121 | 128 | 116 | 119 | 120 | 120 | 120 |
| Tg(PP, DMA) | [° C.] | 0 | 2 | 0.0 | 1.5 | 0.8 | 2 | 2 | 2 |
| Tg(EPR, DMA) | [° C.] | −58 | −50 | −52 | −40 | −54 | −52 | −52 | — |
| XCS | [wt %] | 26 | 29 | 31.6 | 44.0 | 26 | 16 | 9.2 | 2.6 |
| C2(XCS, NMR) | [wt %] | 46 | 48 | 36.6 | 21.2 | 55 | 44 | 44 | n.d. |
| iV(XCS) | [dl/g] | 3.9 | 3.2 | 3.15 | 1.97 | 3.6 | 3.9 | 3.9 | n.d. |
| FM ISO 178 | [MPa] | 870 | 750 | n.m. | n.m. | 901 | 1125 | 1364 | 1649 |
| TM ISO 178 | [MPa] | n.m. | n.m. | 976 | 522 | n.m. | n.m. | n.m. | n.m. |
| NIS ISO 179 1eA 23° C. | [kJ/m$^2$] | 48 | 33 | 66 | 75 | 14 | 8.7 | 3.5 | 1.1 |
| NIS ISO 179 1eA −20° C. | [kJ/m$^2$] | 7.5 | 7.0 | 12.0 | 16.5 | 6.6 | 4.3 | 1.2 | 1.0 |
| C2 total (NMR) | wt % | 17.7 | n.d. | 13.5 | 16.4 | n.d. | 18.7 | 18.7 | 0 |
| EEE total | mol % | 11.2 | n.d. | 7.5 | 8.6 | n.d. | 12.9 | 12.9 | — |
| EEP total | mol % | 9.5 | n.d. | 7.32 | 8.5 | n.d. | 9.4 | 9.4 | — |
| PEP total | mol % | 4.7 | n.d. | 4.05 | 5.2 | n.d. | 4.2 | 4.2 | — |
| PEP total normalized | % | 18.4 | n.d. | 21 | 24 | n.d. | 16.0 | 16.0 | — |
| EEE (XCS) | mol % | 10.5 | n.d. | 13.1 | 6.0 | n.d. | 18.9 | 18.9 | — |
| EEP (XCS) | mol % | 2.5 | n.d. | 20.7 | 10.2 | n.d. | 22.0 | 22.0 | — |
| PEP (XCS) | mol % | 1.0 | n.d. | 12.7 | 12.4 | n.d. | 10.0 | 10.0 | — |
| PEP (XCS) normalized | % | 7.1 | n.d. | 27.3 | 43.4 | n.d. | 19.6 | 19.6 | — |
| total emission | ppm | n.m. | n.m. | 60 | n.d. | n.m. | n.m. | n.m. | n.m. |
| Sh-in flow | % | n.m. | n.m. | 1.23 | 1.45 | n.m. | n.m. | n.m. | n.m. |
| Inequation (I) fulfilled | | no | no | no | no | no | no | no | no | lower shrinkage, whilst maintaining an advantageous impact strength/stiffness balance compared to the comparative examples.

BRIEF DESCRIPTION OF THE FIGURES

This can also be seen from FIG. 1 related to Ex.1 and CE1 and CE5 and also from FIGS. 2 to 4.

The invention claimed is:
1. A heterophasic polypropylene composition comprising:
(A) 48 to 78 wt % of a crystalline isotactic propylene homopolymer matrix having a pentad concentration as determined by $^{13}$C-NMR spectroscopy of more than 96 mol % and a matrix melt flow rate ($MFR_M$) as determined at 230° C. and 2.16 kg load according ISO 1133 in the range of 15 to 200 g/10 min,
(B) 22 to 52 wt % of a predominantly amorphous propylene copolymer with 25 to 48 wt % of ethylene and/or an α-olefin with 4-10 carbon atoms being present in the composition as dispersed particles, and
(C) 0.0 to 5.0 wt % of a crystalline ethylene copolymer with an α-olefin with 3-10 carbon atoms being present in the composition as inclusions of the dispersed particles of (B) and
(D) 0 to 1.0 wt % of an alpha nucleating agent for the α- and/or γ-phase of isotactic polypropylene,
said composition being further characterized by
(i) a total melt flow rate ($MFR_T$) as determined at 230° C. and 2.16 kg load according ISO 1133 in the range of 2.0 to 50 g/10 min,
(ii) a fraction soluble in xylene (XCS) determined at 25° C. according ISO 16152 in the range of 22 to 52 wt %,
(iii) an intrinsic viscosity of the XCS fraction as measured according to DIN ISO 1628/1 in decalin at 135° C. is in the range of 2.5 to 9.0 dl/g and
(iv) a relative content of isolated to block ethylene sequences (I(E)) of the XCS fraction fulfilling the inequation (I):

$$I(E) < 78 - 1.97 \times C + 0.015 \times (C)^2$$

wherein C is the comonomer content [wt %] of the XCS fraction and
wherein the I(E) content is defined by equation (II)

$$I(E) = \frac{fPEP}{(fEEE + fPEE + fPEP)} \times 100 \quad \text{(II)}$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample;
wherein all sequence concentrations being based on a statistical triad analysis of $^{13}$C-NMR data.
2. A heterophasic polypropylene composition according to claim 1, wherein the ratio of $MFR_T/MFR_M$ is ≤0.5.
3. A heterophasic polypropylene composition according to claim 1, having a crystalline polyethylene content with a melting point ($T_m$) from DSC analysis according ISO 11357 in the range of 160 to 170° C. and optionally a crystalline polyethylene content with a melting point from DSC analysis according ISO 11357 in the range of 105 to 130° C.
4. A heterophasic polypropylene composition according to claim 1, comprising either a flexural modulus determined according to ISO 178 (FM) on an injection moulded specimen of 80×10×4 mm$^3$ in the range of 500 to 1100 MPa or a tensile modulus (TM) measured at 23° C. according to ISO 527-1 (cross head speed 1 mm/min) in the range of 500 to 1100 MPa and furthermore by a Charpy notched impact strength (NIS) determined according to ISO 179 1 eA at 23° C. on an injection moulded specimen of 80×10×4 mm$^3$ of at least 10.0 kJ/m$^2$.
5. A heterophasic polypropylene composition according to claim 1, having a total comonomer content defined as the sum of contents of ethylene and α-olefins with 4-10 carbon atoms in the range of 6.0 to 26.0 wt %.
6. A heterophasic polypropylene composition according to claim 1, comprising at least two glass transition points ($T_g$) as determined by dynamic-mechanical thermal analysis according ISO 6721-7, with one $T_g$ ($T_g(1)$) associated to the crystalline isotactic propylene homopolymer matrix being in the range of −4 to 4° C. and another $T_g$ ($T_g(2)$) associated to the predominantly amorphous propylene copolymer being in the range of −60 to −35° C.
7. A heterophasic polypropylene composition according to claim 1, comprising a Charpy notched impact strength determined according to ISO 179 1 eA at −20° C. on an injection moulded specimen of 80×10×4 mm$^3$ in the range of 4.5 to 35 kJ/m$^2$.
8. A heterophasic polypropylene composition according to claim 1, comprising a powder flowability determined according to ISO 6186:1998, Method A, of below 20 seconds, a total emission of volatiles determined according to VDA 277:1995 of below 25 ppm and a shrinkage in the longitudinal direction determined according to the method described in "Description of measuring methods" of less than 1.2%.
9. A heterophasic polypropylene composition according to claim 1, comprising fillers or reinforcements in amount of less than 30 wt % based on the composition.
10. A heterophasic polypropylene composition according to claim 1, wherein the composition has been polymerized in the presence of:
a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound;
b) a co-catalyst (Co), and
c) optionally an external donor (ED).
11. A heterophasic polypropylene composition according to claim 10, wherein said internal donor (ID) is selected from the group comprising malonates, maleates, succinates, citraconates, glutarates, cyclohexene-1,2-dicarboxylates and benzoates, and any derivatives and/or mixtures thereof.
12. A heterophasic polypropylene composition according to claim 10, wherein the molar ratio of co-catalyst (Co) to external donor (ED) [Co/ED] is in the range of 5 to 45, and the molar ratio of co-catalyst (Co) to titanium compound (TC) [Co/TC] is in the range of above 80 to 500.
13. A process for obtaining a heterophasic polypropylene composition according to claim 1, the process comprising:
polymerizing propylene in combination with ethylene and/or an α-olefin with 4-10 carbon atoms in three or more reactors in the presence of:

a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound;

b) a co-catalyst (Co), and c) optionally an external donor (ED).

14. A process according to claim 13, wherein the internal donor (ID) is selected from optionally substituted malonates, maleates, succinates, glutarates, cyclohexene-1,2-dicarboxylates, benzoates and derivatives and/or mixtures thereof.

15. A process for preparing a heterophasic polypropylene composition according to claim 1, using a pre-polymerization reactor (I), one liquid bulk reactor (II) and two or more gas phase reactors (III), (IV) and optionally (V) in series in the presence of:

a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound;

b) a co-catalyst (Co), and c) optionally an external donor (ED), whereby a polypropylene homopolymer matrix (A) is produced in the liquid bulk reactor (II) and the subsequent first gas phase reactor (III) and the propylene copolymer (B) is subsequently produced in the second gas phase reactor (IV) and the optional fourth gas phase reactor (V), yielding a heterophasic polypropylene composition according to claim 1, or yielding a "base a heterophasic polypropylene composition", which is blended with 1.0 to 40 wt %, based on the "base a heterophasic polypropylene composition", of additional polypropylene homopolymer matrix obtained in a liquid bulk reactor (II) and a subsequent first gas phase reactor (III), yielding a heterophasic polypropylene composition according to claim 1.

16. A film, an extruded, blow moulded or injection moulded article comprising a propylene polymer composition according to claim 1.

* * * * *